United States Patent [19]

Foley

[11] Patent Number: 4,830,395
[45] Date of Patent: May 16, 1989

[54] STABILIZER SYSTEM FOR RACING CARS

[76] Inventor: Jimmy D. Foley, 921 Vickie, Ft. Morgan, Colo. 80701

[21] Appl. No.: 158,594

[22] Filed: Feb. 22, 1988

[51] Int. Cl.$^4$ .......................... B60G 11/58; F16F 9/46
[52] U.S. Cl. .................................... 280/698; 280/693; 267/177; 267/255
[58] Field of Search ............... 280/724, 725, 726, 706, 280/708, 710, 712; 267/218, 177, 255, 221; 188/299

[56] References Cited

U.S. PATENT DOCUMENTS

| | | | |
|---|---|---|---|
| 2,950,785 | 8/1960 | Patriquin | 188/276 |
| 3,096,084 | 7/1963 | Osterhoudt | 267/218 |
| 3,386,345 | 6/1968 | Taplin | 403/165 |
| 3,563,566 | 2/1971 | Weber | 280/702 |
| 3,854,710 | 12/1974 | Nicholls | 280/708 |
| 4,052,088 | 10/1977 | Nicholls | 280/708 |
| 4,159,105 | 6/1979 | Vander Laan et al. | 267/177 |
| 4,275,900 | 6/1981 | Andreiol et al. | 280/710 |

FOREIGN PATENT DOCUMENTS 1109538  6/1961  Fed. Rep. of Germany ...... 280/688

OTHER PUBLICATIONS

Exhibit A: Photocopy of the CARERRA Model 5100 Series Shock Absorber.

Primary Examiner—Charles A. Marmor
Assistant Examiner—Karin Tyson
Attorney, Agent, or Firm—John E. Reilly

[57] ABSTRACT

A stabilizer system for racing cars includes a fluid dampener installed between the chassis and wheel axle either at the left rear or right front of the car and has an outer spring member on the dampener which is preloaded by threadedly adjustable stop members at either or both ends of the spring; and an outer concentric cylinder in surrounding relation to the dampener has an annular piston extending through one end of the cylinder and bears against one of the adjustable stop members, there being a remote control fluid flow device accessible to the driver to regulate the fluid under pressure applied to the outer concentric cylinder so as to permit adjustment in loading of the spring when the car is in motion.

9 Claims, 2 Drawing Sheets

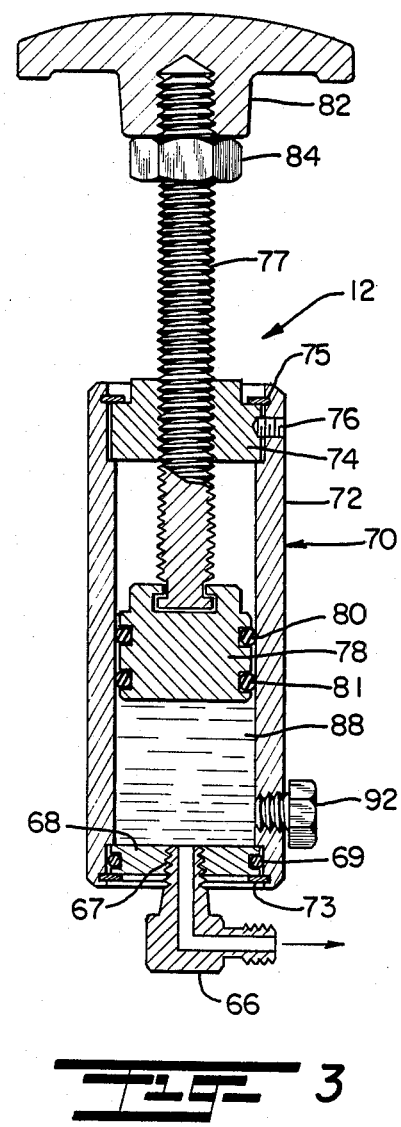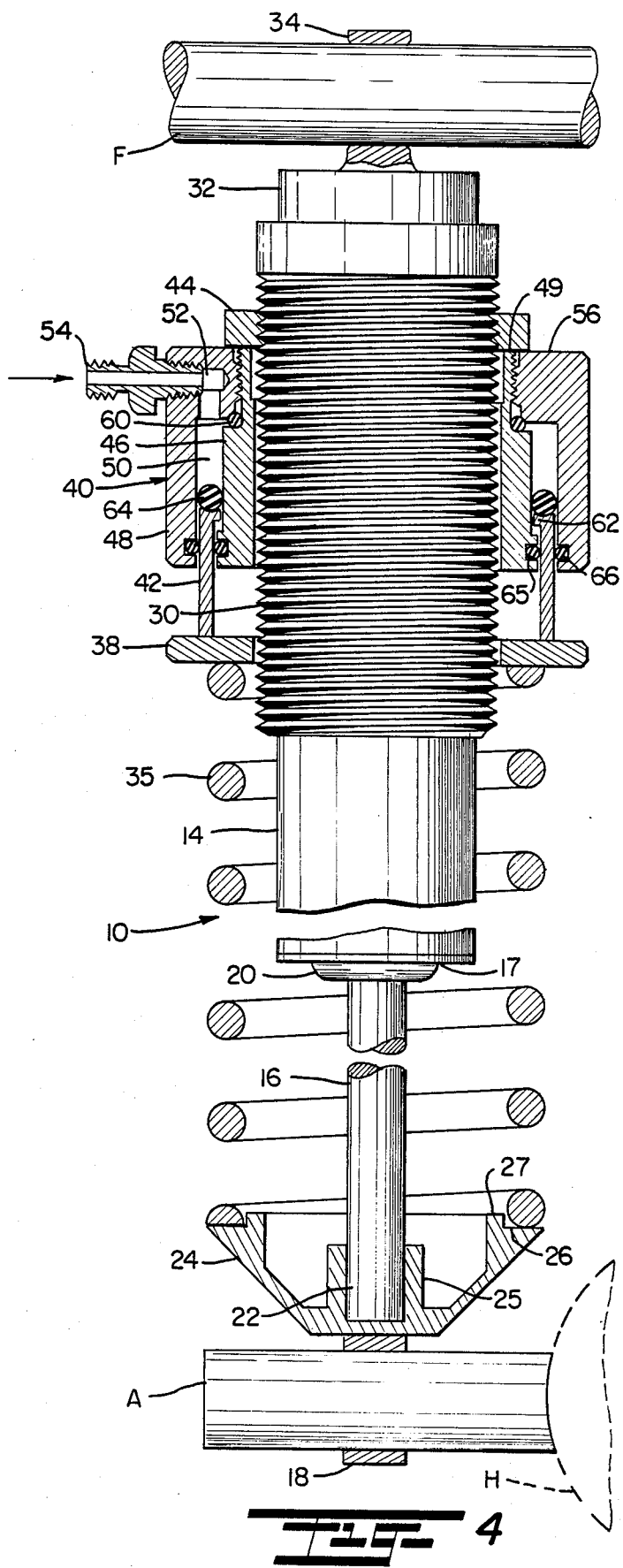

STABILIZER SYSTEM FOR RACING CARS

This invention relates to vehicle suspension units and more particularly relates to novel and improved stabilizer systems of the type adapted to be installed in racing cars and remotely controlled from the driver's compartment of the motor vehicle.

BACKGROUND AND FIELD OF INVENTION

It is customary to mount an adjustable weight jack between the chassis and axle of a racing car at least at the inside or left rear of the car when it is traveling in a counterclockwise direction around a track. Specifically, the jack is pre-loaded in order to compensate for or counteract the increased pressure applied to the inside rear of the car, for example, as the car enters a turn. In this relation, the degree or amount of pressure or force of the tire against the track surface will vary according to actual conditions on the track. Thus, as track conditions become dry, there is more of a tendency for the front end to slide than for the rear end. Conversely, as the track becomes more tacky, there is more of a tendency for the rear end of the car to slide.

Currently, weight jacks are typically in the form of shock absorbers which are preloaded to compensate for forces expected to be encountered during the course of a race but can be adjusted only when the car makes a pit stop and the mechanic can get under the car to adjust the loading of the jack. For example, one such weight jack is the Carrera Model 5100 Series Shock Absorber manufactured and sold by the Carrera Company of Atlanta, Ga. Other shock absorbers have been devised to compensate for changes in vehicle loading and, for instance, U.S. Pat. Nos. 3,854,710 and 4,052,088 to Nicholls disclose units in which a hand wheel in combination with a moveable piston can be employed to adjust the height of a cylinder which is used to compensate for changes in vehicle loading. In U.S. Pat. No. 4,159,105 to Vander Laan a remote control device uses hydraulic fluid to regulate the pressure and height of a main cylinder or shock absorber and is specifically designed for load-levelling adjustment of motorcyles. U.S. Pat. No. 4,275,900 to Andreoli discloses another type of pre-loading adjustment for motorcycles. Other representative U.S. patents are those to Weber, No. 3,563,566 and to Patriquin, No. 2,950,785.

In accordance with the present invention, it is desirable to provide for a novel and improved method and means by which a weight jack or stabilizer may be pre-loaded in advance of a race as well as closely adjusted during the race to compensate for changes in road or track conditions without the necessity of stopping the vehicle. It is important also to enable the driver to selectively adjust the loading both at the front and rear ends of the vehicle according to road conditions and particularly in accordance with changes in the degree of dryness or tackiness of the road surface.

SUMMARY OF THE INVENTION

It is therefore an object of the present invention to provide for a novel and improved stabilizer system for motor vehicles which is closely and accurately controllable while the car is in motion and wherein the stabilizer system can be adjusted by the driver in accordance with variations in road or track conditions.

Another object of the present invention is to provide for a remote controlled stabilizer system(s) which can be installed at one or more corners or ends of the front and rear axles of the motor vehicle and controlled from the dashboard or instrument panel of the vehicle.

It is an additional object of the present invention to provide in a stabilizer system for motor vehicles, and particularly racing cars, for a closely controllable weight jack which can be regulated according to the relative pressure or loading of the tire against the road surface at each corner of the vehicle, particularly as it negotiates turns or is otherwise subjected to centrifugal or lateral forces.

It is a still further object of the present invention to provide in a vehicle stabilizer system for a novel and improved weight jack in the form of a hydraulic fluid-operated cylinder which is responsive to minor changes in fluid pressure to regulate the relative loading or pressure of the tires against the road's surface.

In a preferred form of stabilizer system in accordance with the present invention, a conventional fluid-filled cylinder or fluid dampener has a piston rod extending from one end of the cylinder, and first and second connectors at opposite ends of the first cylinder and the piston rod facilitate installation of the cylinder and rod between a sprung part, such as, the chassis and an unsprung part, such as, the axle of a motor vehicle. Most desirably, in a racing car, the cylinder and rod are installed at the inside or left rear corner of the vehicle where the loading is greatest as the car negotiates a turn. A spring member is disposed externally of and in surrounding relation to the cylinder between a stop member on the piston rod and a second adustable stop member on the cylinder whereby the degree of pre-loading or pressure exerted by the spring is in a direction tending to force the piston rod outwardly or away from the cylinder and can be regulated by the effective length or spacing between the stop members. Load-adjusting means in accordance with the present invention comprise an annular cylinder adjustably mounted on the first cylinder and having an annular piston which is movable through and extends outwardly from the annular cylinder into abutting relation to one end of the spring member; and fluid flow control means is controllable by the driver from the operator section of the vehicle to adjust the fluid pressure in the annular cylinder whereby to regulate the movement of the annular piston against the spring and thereby regulate the pressure or loading of the spring member and system. As will become more apparent, a stabilizer system as described may be mounted at one or more corners of the vehicle and independently but remotely controlled by the operator without the necessity of stopping the vehicle.

The above and other objects, advantages and features of the present invention will become more readily understood and appreciated from a consideration of the following detailed description of a preferred embodiment thereof when taken together with the accompanying drawings, in which:

BRIEF DESCRIPTION OF THE DRAWINGS

FIG. 3 is a cross-sectional view illustrating a preferred form of fluid flow control device in accordance with the present invention and which device forms a part of the preferred embodiment of the present invention; and FIG. 4 is a detailed view partially in section of a preferred form of weight jack in accordance with the present invention.

DETAILED DESCRIPTION OF THE PREFERRED EMBODIMENT

Figure 1:
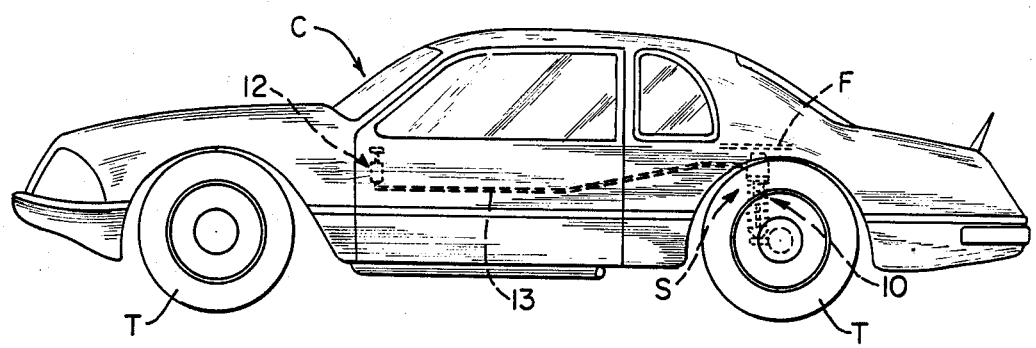
FIG. 1 is a side view in elevation showing a conventional automobile incorporating a preferred form of stabilizer system in accordance with the present invention.

Referring in more detail to the drawings, there is broadly illustrated in FIG. 1 a motor vehicle or racing car C in which a preferred form of stabilizer system S is illustrated in dotted form and broadly comprises a weight jack 10, control device 12 and control or delivery line 13 extending from the device 12 to the weight jack 10.

The weight jack 10 comprises a conventional form of fluid dampener made up of a fluidfilled first hydraulic cylinder 14 and a piston including a piston rod 16 extending downwardly through one end 17 of the cylinder 14 and terminating in an end connector defined by an eye 18. A suitable form of gasket 20 is positioned at the lower end 17 of the cylinder 14 in surrounding sealed relation to the piston rod 16, and the end of the rod 16 adjacent to the eye is externally threaded as at 22 for adjustable mounting of an end stop 24. The end stop 24 is affixed to the lower end of a nut 25 which threadedly engages the portion 22. The stop 24 is of generally conical configuration and terminates in an upwardly facing shoulder 26 having a ledge 27 at the inner periphery of the shoulder portion 26 to support the lower end of a spring member 35.

The first cylinder 14 has an externally threaded wall portion 30 extending the greater length of the cylinder 14, and upper closed end 32 of the cylinder terminates in an end connector or eye 34 which may suitably be attached to one part of a chassis or sprung portion F of the vehicle C. The opposed end connector 18 at the lower end of the piston rod is suitably attached to an extension arm A on a spindle housing H at one end of the rear wheel axle adjacent to one of the ground engaging tires T on the vehicle. As described, the weight jack assembly 10 is generally representative of shock absorbers employed between the chassis and axle of a vehicle, such as, the Carrera Model 5100 Series described earlier. Although not shown, the internal piston at the upper end of the piston rod 16 is dampened in a conventional manner by hydraulic fluid within the cylinder 14 so as to absorb loading or sudden changes in pressure or force applied between the tire T and chassis of the vehicle.

In order to pre-load the shock absorber assembly and selectively increase the loading at one end of an axle, the coiled spring member 35 is positioned in surrounding relation to the cylinder 14 and the piston rod 16 with the lower end of the spring member 35 abutting the shoulder 26 at the outer peripheral edge of the stop 24. The spring member 35 is mounted under compression between the lower stop member 24 and an upper adjustable stop 38 so that the degree of tension or force exerted by the spring 35 in a direction urging the piston rod outwardly from the cylinder 15 is regulated by the effective distance or spacing between the stop members 24 and 28. To this end, a second annular cylinder 40 is disposed in outer concentric relation to the threaded wall portion 30 of the cylinder 14 with the adjustable stop member 38 disposed at the lower end of an annular piston 42 extending downwardly from the cylinder 40. The cylinder 40 is disposed in closely spaced outer surrounding relation to the threaded wall 30 and is supported or restrained at one end by a nut 44 which is threadably connected to and adjustable along the threaded wall surface 30. The annular cylinder 40 has an inner wall 46 and an outer wall 48 defining a fluid chamber 50 therebetween which communicates via oil port 52 at upper end of the wall 48 with a hose fitting 54 at one end of the control line 13. It will be noted that the outer wall 48 includes an end wall 56 extending radially inwardly from the wall 48 and which threadably engages a complementary end portion 49 at the upper end of the inner wall 46, and an annular seal 60 is interposed between the lower ends of the walls 56 and 58. In this relation, the nut 44 bears against the upper surfaces of the ends 56 and 49.

The annular piston member 42 is of uniform wall thickness throughout except for an enlarged piston end 62 which is movable through the chamber 50 and has an upper concave end surface to facilitate seating of a seal ring 64. In addition, a pair of annular seals 65 and 66 are positioned in aligned grooves in facing relation to one another on the inner and outer walls 46 and 48 at the lower end of the chamber 50, and the seals 65 and 66 bear against opposite surfaces of the piston 42. It will be evident that the circulation of fluid under pressure through oil port 52 will force the piston 42 in a direction downwardly through the chamber 50 and, depending upon the degree of hydraulic pressure, increase the loading or spring force exerted by the spring 35 via piston rod 16 agaisnt the spindle housing H. In addition, the initial position of adjustable stop 38 is adjusted or set by the threaded advancement of the nut 34 on the threaded wall surface 30. As a result, the spring 35 is pre-loaded by threaded adjustment of the stop members 24 and 38 as described and then further adjusted by regulating the hydraulic pressure introduced into the cylinder 40 via the control line 13.

Figure 2:
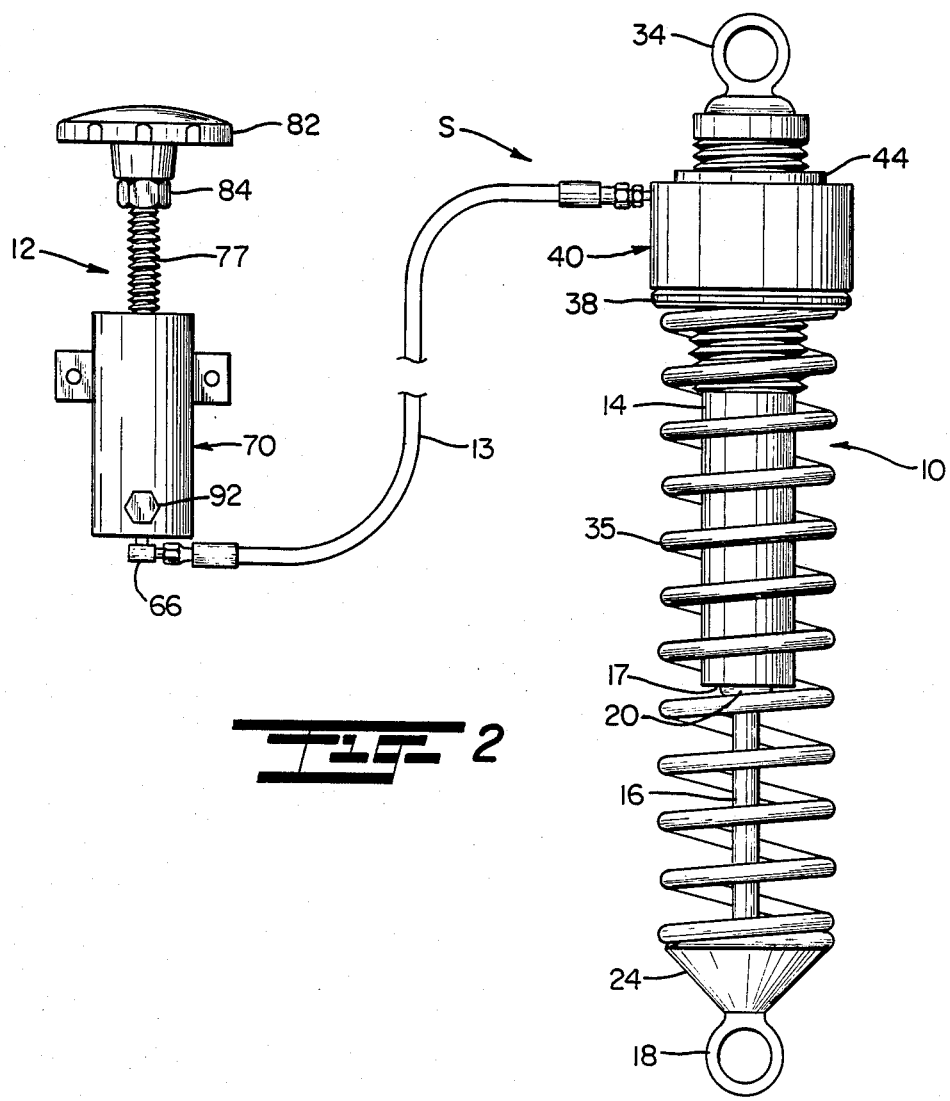
FIG. 2 shows a preferred form of stabilizer system in accordance with the present invention and greatly enlarged with respect to FIG. 1.

The control line 13, as shown in FIGS. 2 and 3, is connected to fitting 66 which communicates with a port 67 in lower end wall 68 of a control cylinder 70, as shown in FIG. 3. Preferably, the cylinder 70 and associated fitting 66 are mounted in the driver's compartment of the vehicle, such as, the dashboard or instrument panel so as to be conveniently accessible to the driver and permit regulation of the hydraulic pressure of fluid directed into the cylinder 40. The cylinder 70 includes a cylinder wall 72 of uniform diameter throughout its greater length with the end wall 68 including annular seal 69 attached in place at the lower end of the cylinder 72 by a snap ring 73, and an upper end wall 74 is secured in place by means of a snap ring 75 and set screw 76. The upper end wall 74 is in the form of a drive nut having an internally threaded bore through which extends a threaded stem 77 having a piston 78 attached to the lower end of the stem. Annular seals 80 and 81 are positioned in vertically spaced annular grooves on the external surface of the piston 78 so as to sealingly engage the inner surface of the cylinder wall 72. The upper end of the stem 77 has a hand wheel or manual control knob 82 which is securely affixed to the end of the stem 77 and provided with a jamb nut 84 to prevent accidental loosening of the knob 82 when manipulated by the race car driver. A hydraulic fluid designated at 88 in cylinder 70 is introduced through an opening in the cylinder wall which is normally closed by plug 92.

The fluid 88 will normally fill the chamber area of the cylinder 70 beneath the piston so that, when the piston 78 is advanced by the knob 82, will be directed via control line 13 through the upper end of the piston 40. It will be seen that the piston 78 is effectively journaled at the end of the stem 77 so that the piston will be free to advance in an axial direction without turning or twisting within the cylinder 70 when the stem 77 is advanced by the hand wheel. Accordingly, it is necessary to positively turn or manipulate the knob 82 in order to increase or decrease the pressure of fluid in the cylinder 40 so that, once loaded or set in a given position by the operator, will consistently exert or apply a uniform pressure to the stop 38 and spring 35 until reset.

In the preferred embodiment, as illustrated in FIG. 1, the weight jack 10 is positioned at the inside or left rear axle of the car so that the operator or driver may pre-load the system prior to a race by adjustment of the end stop member 38, specifically by threaded adjustment of the nut 44. Thus movement of the nut 44 in a direction to reduce the spacing or distance between the stops 24 and 30 will increase the loading or pressure exerted by the spring 35 on the piston rod. In this regard, utilization of the greater length of the cylinder 14 as a means of threaded adjustment as represented at 30 permits a wide latitude of change or degree of pre-loading of the shock absorber assembly between the frame portion F and extension arm A. Pre-loading at the inside left rear corner of the vehicle is most important or critical in overcoming any tendency of the car to slide or sway under centrifical forces encountered particularly in negotiating sharp turns. Thus, as the car enters a turn, increased loading exerted by the left rear tire will increase the loading at the right front tire to assist in resisting any tendency to slip or slide in a sideward direction and thus overcome any tendency of the front end of the vehicle to slide as track conditions become dry. For this reason, increasing the loading under changing track conditions, such as, by increasing the hydraulic pressure applied to the second or outer cylinder 40 by manipulation of the knob 82 will increase the loading at the left rear and right front tires. In the preferred embodiment as described, the degree of change in loading that can be regulated by remote control through the flow control cylinder 70 is not as great as the degree of threaded adjustment permitted by manipulation of the nut 44 along the cylinder wall 30. Nevertheless, finer or more closely controlled adjustment is afforded through manipulation of the hand wheel 18 and advancement or retraction of the piston 42 with respect to the cylinder 40.

From the foregoing, it will be understood that the stabilizer system may include weight jacks at one or more corners or ends of an axle on the motor vehicle. For example, weight jacks may be positioned at either or both the front right and rear left tires in regulating the degree or amount of loading. Moreover, it will be apparent that the mounting of the weight jacks may be modified such that the cylinder end of the weight jack is attached to the lower extension arm A from the spindle and the rod end is attached to the upper frame portion F of the chassis and nevertheless accomplish the intended result.

It is therefore to be understood that various modifications and changes may be made in the construction and arrangement of parts, their precise installation and location on a vehicle without departing from the spirit and scope of the present invention as defined by the appended claims.

I claim:

1. In an automotive vehicle stabilizer system in which said vehicle has a chassis, front and rear axles and front and rear pairs of ground-engaging wheels at opposite ends of said axles with a fluid dampener interposed between said chassis and one of said front and rear axles, said fluid dampener having a first fluid-filled cylinder, a piston rod extending through one end of said cylinder, and first and second connecting means connecting opposite ends of said cylinder and piston rod to said chassis and axle, the combination therewith comprising:

load-adjusting means associated with said fluid dampener including spring means disposed externally of and in surrounding relation to said first fluid-filled cylinder, a first stop member secured to said piston rod and a second stop member movably mounted in surrounding relationship to said first cylinder, said spring means mounted under compression between said first and second stop members whereby to exert a force in a direction tending to increase the outward extension of said piston rod from said first cylinder, a second annular cylinder in surrounding relation to said first cylinder, an annular piston movable through and extending outwardly from one end of said second cylinder into engagement with said second stop member, and axial adjusting means between said first and second cylinders for adjustably mounting said second cylinder in surrounding relation to said first cylinder for lengthwise axial adjustment of said second stop member toward and away from said first stop member whereby to vary the degree of force applied by said spring means against said piston rod; and remote control fluid flow control means for adjusting fluid pressure in said second cylinder including a source of fluid under pressure and means for applying said fluid under pressure to said second cylinder to regulate movement of said piston against said first stop member to control the degree of force applied by said spring means against said piston rod.

2. In a stabilizer system according to claim 1, said fluid flow control means including a control cylinder containing said hydraulic fluid under pressure therein, a piston movable through said control cylinder, and said fluid-applying means operatively connected to said piston to regulate the movement of said piston through said control cylinder.

3. In a stabilizer system according to claim 2, said fluid applying means including a threaded stem member insertable through a threaded bore at one end of said control cylinder, one end of said stem member being attached to said piston, and a manual control knob at the opposite end of said stem member to said piston.

4. In a stabilizer system according to claim 3, said one end of said stem member being rotatable independently of said piston.

5. In a stabilizer system according to claim 1, including a delivery line between said fluid flow control means and said second cylinder, said fluid control means being positioned in an operator section of said vehicle so as to be accessible to the driver.

6. In a stabilizer system according to claim 1, including means for mounting said first stop member at an external end of said piston rod.

7. A suspension unit for installation between a sprung and unsprung part of a motor vehicle comprising a first fluid-filled inner cylinder and a piston in said cylinder having a piston rod extending through one end of said first cylinder, a second annular cylinder in surrounding relation to said first cylinder including an annular piston extending through one end of said second cylinder, threadedly adjustable mounting means adjustably mounting said second cylinder on said outer wall of said first cylinder for axially adjustable connection of said second cylinder to said first cylinder, a stop member mounted on said piston rod outwardly of said first cylinder, a spring member mounted under compression between said annular piston and said stop member, and fluid flow control means for applying fluid under pressure to said second cylinder whereby to control the length of extension of said annular piston from said second cylinder and regulate the force of said spring member applied to said stop member.

8. In a suspension unit according to claim 7, said fluid flow control means including a source of hydraulic fluid under pressure remote from said first and second cylinders, a delivery line from said source of fluid to said second cylinder, and manual control means associated with said fluid supply source to control the delivery of fluid under pressure from said source into said second cylinder.

9. In a suspension unit according to claim 7, said mounting means defined by external threading on said first cylinder, and a threadedly adjustable nut member bearing against said second cylinder and engageable with said threading on said first cylinder.

* * * * *